(12) United States Patent
Wu et al.

(10) Patent No.: US 8,746,730 B2
(45) Date of Patent: Jun. 10, 2014

(54) FOLDABLE FRAME FOR FOLDABLE MOTORIZED VEHICLE

(71) Applicants: Chi-Chun Wu, Dongguan (CN); Zhao Zhang, Dongguan (CN)

(72) Inventors: Chi-Chun Wu, Dongguan (CN); Zhao Zhang, Dongguan (CN)

(73) Assignee: Dongguan Prestige Sporting Products Co. Ltd., Dongguan (CN)

( * ) Notice: Subject to any disclaimer, the term of this patent is extended or adjusted under 35 U.S.C. 154(b) by 0 days.

(21) Appl. No.: 13/741,257

(22) Filed: Jan. 14, 2013

(65) Prior Publication Data
US 2014/0125036 A1    May 8, 2014

(30) Foreign Application Priority Data
Nov. 2, 2012   (CN) .......................... 2012 1 0431697

(51) Int. Cl.
*B62K 15/00*   (2006.01)
(52) U.S. Cl.
USPC ......... 280/639; 280/87.05; 280/287; 180/208
(58) Field of Classification Search
USPC ................ 280/639, 87.05, 287, 278, 87.021; 180/208; 297/188.01, 16.1, 129, 297/344.15
See application file for complete search history.

(56) References Cited

U.S. PATENT DOCUMENTS

| | | | | | |
|---|---|---|---|---|---|
| 2,594,034 | A * | 4/1952 | King | .............................. | 180/208 |
| 4,046,349 | A * | 9/1977 | MacAfee | ...................... | 248/424 |
| 6,530,446 | B1 * | 3/2003 | Lin | ................................ | 180/208 |
| 6,883,817 | B2 * | 4/2005 | Chu | ............................... | 280/278 |
| 7,077,229 | B2 * | 7/2006 | Lee | ................................. | 180/220 |
| 7,654,356 | B2 * | 2/2010 | Wu | ................................. | 180/208 |
| 7,918,503 | B2 * | 4/2011 | Ahlqvist et al. | .............. | 297/234 |
| 7,926,606 | B2 * | 4/2011 | Wang | ............................ | 180/208 |
| 8,066,294 | B2 * | 11/2011 | Tsai | ............................... | 280/278 |
| 2005/0077097 | A1 * | 4/2005 | Kosco et al. | ................... | 180/208 |
| 2005/0173175 | A1 * | 8/2005 | Lee | ................................. | 180/208 |
| 2005/0263979 | A1 * | 12/2005 | Sinclair et al. | ................ | 280/278 |
| 2006/0086553 | A1 * | 4/2006 | Chen | ............................. | 180/208 |
| 2007/0051548 | A1 * | 3/2007 | Kosco et al. | ................... | 180/208 |
| 2008/0309046 | A1 * | 12/2008 | Wang | ......................... | 280/250.1 |
| 2009/0020350 | A1 * | 1/2009 | Wu | ................................. | 180/208 |
| 2009/0308676 | A1 * | 12/2009 | Wang | ............................ | 180/208 |
| 2010/0187034 | A1 * | 7/2010 | Wang | ............................ | 180/208 |
| 2010/0301582 | A1 * | 12/2010 | Tsai | ............................... | 280/278 |
| 2012/0073891 | A1 * | 3/2012 | Kim et al. | ..................... | 180/219 |
| 2013/0062846 | A1 * | 3/2013 | Hsiao | ......................... | 280/87.05 |

* cited by examiner

*Primary Examiner* — J. Allen Shriver, II
*Assistant Examiner* — Steve Clemmons
(74) *Attorney, Agent, or Firm* — Morris Manning & Martin LLP; Tim Tingkang Xia, Esq.

(57) ABSTRACT

A foldable frame includes first and second upper bars, first and second lower bars, and first and second pin joint pieces. The first and second pin joint pieces are respectively provided with first and second pin joint holes. The first and second lower bars are respectively fixed with the first and second pin joint pieces. The first pin joint piece is pin-jointed with the second pin joint piece through the first pin joint hole, and end surfaces of the first and second pin joint pieces respectively abut against end portions of the second and first lower bars. Two ends of the first upper bar are respectively pin-jointed with an upper end of a front wheel support and at the second pin joint hole of the second pin joint piece. Two ends of the second upper bar are respectively pin-jointed with a rear wheel support and at the second pin joint hole of the first pin joint piece.

11 Claims, 10 Drawing Sheets

FOLDABLE FRAME FOR FOLDABLE MOTORIZED VEHICLE

CROSS-REFERENCE TO RELATED PATENT APPLICATIONS

This application claims priority to and the benefit of, pursuant to 35 USC §119(a), Chinese patent application No. 201210431697.9, filed Nov. 2, 2012 in the State Intellectual Property Office of P.R. China, which is incorporated herein by reference in its entirety.

FIELD OF THE INVENTION

The present invention relates generally to a foldable motorized vehicle, and more particularly to a foldable frame used in a foldable motorized vehicle that is convenient to fold, has a stable structure, saves the storage space, and has desirable portability.

BACKGROUND OF THE INVENTION

With the improvement of the living standard, personalized, fashionable, healthy and environmental-friendly life concepts are becoming deeply rooted in the hearts of people. Fashion and green articles for daily use and vehicles are more and more popular. Bicycles and electric scooters are no longer merely a means of transport, but have become a symbol of a fashionable and healthy life style and a way of practicing environmental protection. A space-saving and portable foldable bicycle or electric scooter is small and light after being folded, and it is convenient to go up and down the stairs or escalators and take a bus or subway carrying the foldable bicycle or electric scooter.

A folding manner of current foldable bicycles or electric scooters (motorized vehicles) is simple. Usually, a folding mechanism is disposed between a front wheel steering bar and a body support. The front wheel steering bar and the body support are folded by means of the folding mechanism. Such a folding manner is simple, but the size after folding is still large. A folding mechanism for folding the body is also available. However, such a folding mechanism only performs simple pin joint on front and rear body supports, a foldable frame formed thereby is unstable, and this folding mechanism fails to ensure the driving safety. Moreover, the scooter requires complex operation procedures for folding the body, and it is especially difficult for those who have physical mobility problems to perform such a complex folding operation.

Therefore, it is necessary to design a foldable frame that is convenient to fold, has a stable structure, is space saving, and has desirable portability.

SUMMARY OF THE INVENTION

The present invention is directed to a foldable frame that is convenient to fold, has a stable structure, is space saving, and has desirable portability. The foldable frame is utilized in a foldable motorized vehicle.

To achieve the above objective, a foldable frame provided by the present invention is mounted between a front wheel support and a rear wheel support of a foldable motorized vehicle. The foldable frame includes a first upper bar, a first lower bar, a second upper bar, a second lower bar, a first pin joint piece and a second pin joint piece. The first pin joint piece and the second pin joint piece are respectively provided with a first pin joint hole and a second pin joint hole. An end of the first lower bar is pin-jointed with a lower end of the front wheel support, and another end of the first lower bar is fixed with the first pin joint piece. An end of the second lower bar is pin-jointed with a lower end of the rear wheel support, and another end of the second lower bar is fixed with the second pin joint piece. The first pin joint piece is pin-jointed with the second pin joint piece through the first pin joint hole, and end surfaces of the first pin joint piece and the second pin joint piece respectively abut against end portions of the second lower bar and the first lower bar. An end of the first upper bar is pin-jointed with an upper end of the front wheel support, and another end of the first upper bar is pin-jointed at the second pin joint hole of the second pin joint piece. An end of the second upper bar is pin-jointed with the rear wheel support, and another end of the second upper bar is pin-jointed at the second pin joint hole of the first pin joint piece.

Preferably, the foldable frame further includes a foldable seat. The foldable seat includes a seat, a first support bar and a second support bar. A front end of the seat is pin-jointed with an upper end of the rear wheel support. A rear end of the seat is pin-jointed with an end of the first support bar. Another end of the first support bar is pin-jointed with an end of the second support bar. Another end of the second support bar is pin-jointed with the rear wheel support. Two ends of the seat are pin-jointed with the rear wheel support and the first support bar, and the second support bar is pin-jointed with the first support bar, so that the rear wheel support, the seat, the first support bar and the second support bar form a flexible quadrilateral, thereby achieving the objective of folding or unfolding the seat. The structure is simple, and the folded seat significantly saves the storage space.

Specifically, the foldable frame further includes a linkage bar. A connection portion is extended from an end, and pin jointed with a middle portion of the rear wheel support of the second support bar. A tail end of the connection portion is pin-jointed with an end of the linkage bar, and another end of the linkage bar is pin-jointed with the second lower bar. A connection portion is extended from an end of the second support bar, and the linkage bar is connected between the connection portion and the second lower bar, so that when the seat is folded towards the rear wheel support, the linkage bar is driven by the second support bar and the second lower bar is driven at the same time, thereby ultimately achieving the objective of simultaneously folding the first upper bar, the first lower bar, the second upper bar and the second lower bar while folding the seat, contributing to convenient and fast folding of the entire foldable frame.

Specifically, the foldable seat further includes a third support bar and a locking mechanism. An end of the third support bar is pin-jointed with the first support bar. A first long hole is opened on a side wall of the seat. A shaft pin is disposed at another end of the third support bar. The shaft pin is disposed in the first long hole in a sliding manner. The locking mechanism includes a fastening hook. A rear end of the fastening hook is pin-jointed with a fixing shaft disposed at a bottom portion of the seat, and is capable of being separately fastened with the shaft pin. Through disposing the third support bar between the seat and the first support bar and providing, on the side wall of the seat, the first long hole for the end portion of the third support bar to slide through, the seat, the first support bar and the third support bar form a flexible triangle. The fastening hook of the locking mechanism unlocks or locks the third support bar, so as to control the third support bar to swing or to be fixed, and further control the entire foldable seat to be folded or unfolded, thereby improving the stability of the foldable seat structure and ensuring the use safety.

More specifically, the locking mechanism further includes a pushing piece. The pushing piece is mounted on the side wall of the seat in a sliding manner and a pushing block is provided at an end of the pushing piece. A receiving hole with an opening is opened on the fastening hook. The pushing block is received in the receiving hole in a sliding manner. The opening is used for the pushing block to enter and exit. A front end of the receiving hole has a first slope tilted from an upper end to the front end, and the pushing block abuts against the first slope in a sliding manner. When the fastening hook is fastened with the shaft pin, the fastening hook needs to be manually released from the shaft pin during unlocking. Therefore, the pushing piece is disposed and the pushing block is provided on the pushing piece. The pushing block slides in the receiving hole of the fastening hook and abuts against the first slope. Therefore, under the guiding function of the first slope, the fastening hook is pushed to be released from the shaft pin, thereby achieving the unlocking objective. The pushing piece functions to drive the unlocking, contributing to use convenience for users.

More specifically, a front end of the fastening hook has a second slope tilted from an upper end to a rear end, and when the shaft pin slides backward along the first long hole, the second slope abuts against the shaft pin in a sliding manner. When the shaft pin and the fastening hook need to be fastened again, the fastening hook needs to be pushed upward. Therefore, the second slope is provided, and by means of the guiding function of the second slope, the shaft pin drives the fastening hook to rotate upward while the shaft pin is sliding, so that the fastening hook is automatically fastened on the shaft pin.

More specifically, the locking mechanism further includes a torsion spring. An end of the torsion spring abuts against a rear end of the fastening hook, and another end of the torsion spring abuts against the seat. The foldable seat needs to be locked when being unfolded, and at this time, fastening between the fastening hook and the shaft pin needs to be maintained. Therefore, by means of the automatic resilience of the torsion spring, the fastening hook automatically rotates downward, thereby ensuring the fastening with the shaft pin, and preventing the danger of unexpected folding during driving due to the accidental release of fastening hook from the shaft pin when the seat is unfolded.

Further, a second long hole is opened on the side wall of the seat. A sliding shaft is disposed on the pushing piece, and the sliding shaft passes through the second long hole in a sliding manner. By means of sliding coordination between the second long hole and the sliding shaft, the pushing piece is disposed on the side wall of the seat in a sliding manner, so as to conveniently drive the fastening hook to be unlocked.

Further, the locking mechanism includes an elastic piece. An end of the elastic piece is connected to the fixing shaft, and another end of the elastic piece is connected to the sliding shaft. By means of the elastic resilience of the elastic piece, the pushing piece automatically moves backward, so that the pushing block automatically returns to the receiving hole, thereby effectively implementing next unlocking.

Further, the elastic piece is an extension spring.

In the present invention, the first pin joint piece is fixed at an end of the first lower bar. The second pin joint piece is fixed at an end of the second lower bar. The first and second pin-joint pieces are pin-jointed with each other. Besides, two ends of the first upper bar are respectively pin-jointed with the front wheel support and the second pin joint piece, and two ends of the second upper bar are respectively pin-jointed with the rear wheel support and the first pin joint piece, thereby forming the foldable frame structured by two pin-jointed quadrilateral supports. By means of the properties of variation and linkage of the two quadrilateral supports, the objective of folding or unfolding the foldable frame is achieved. Moreover, when the first lower bar and the second lower bar are unfolded, the end portion of the first pin joint piece abuts against the end portion of the second lower bar, and meanwhile the end portion of the second pin joint piece abuts against the end portion of the first lower bar. Under the effect of interaction, the foldable frame formed of two quadrilateral supports is in a stable state, achieving the bearing objective. In this way, the entire foldable frame has a stable structure. The foldable frame is folded as long as any one of the bars is rotated around the pin joint point thereof. The foldable frame is convenient to use, has a small size after being folded, significantly saves the storage space, and has desirable portability during traveling.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

In order to clearly describe the detailed structure and technical advantages over current products of the multifunctional lift chair deployment mechanism, a possible embodiment is described below through a non-limiting example applying the principle and with reference to the accompanying drawings, wherein.

DETAILED DESCRIPTION OF THE INVENTION

Figure 1:
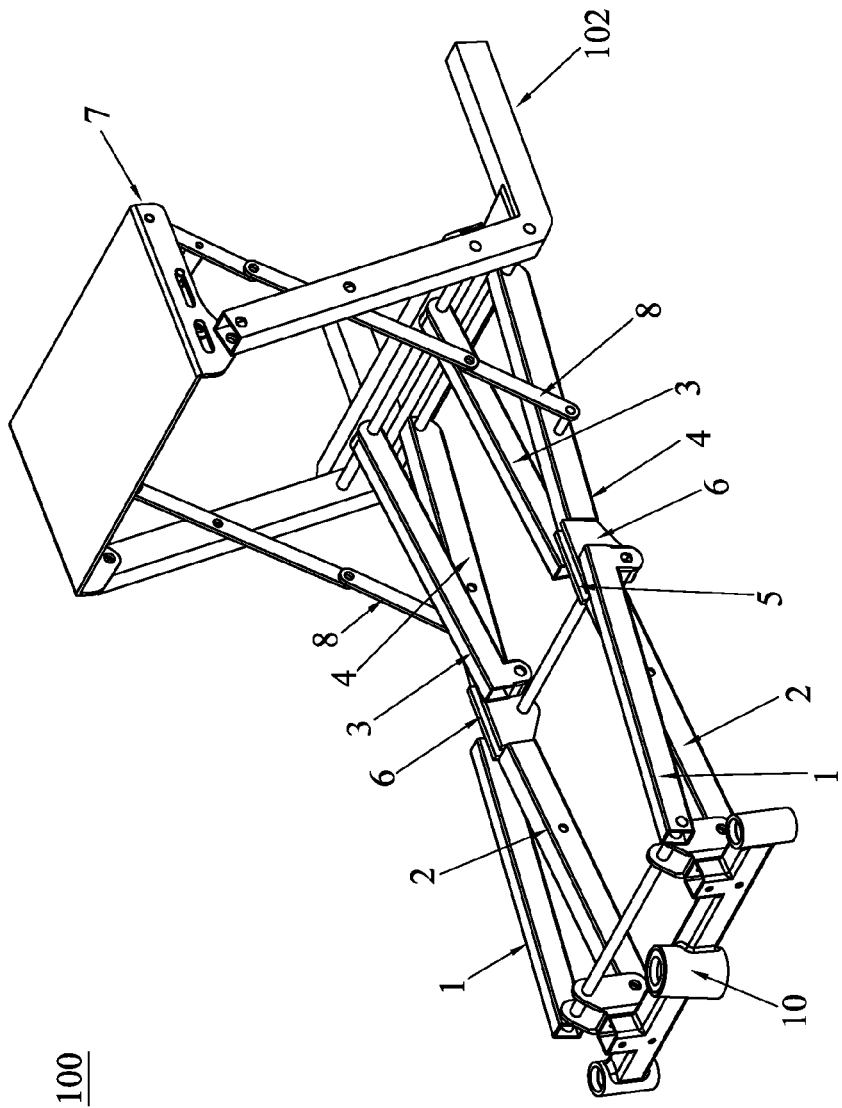
FIG. 1 is a schematic structural view of a foldable frame according to the present invention.
Figure 2:
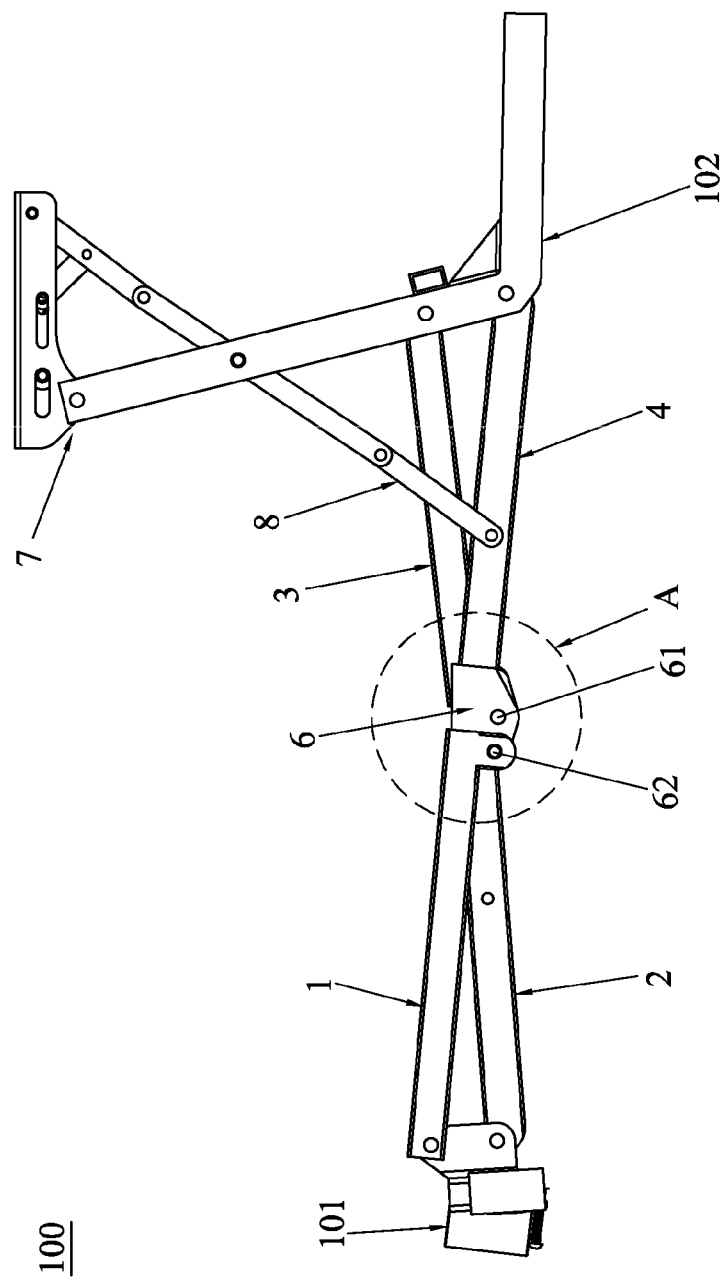
FIG. 2 is a side view of a foldable frame according to the present invention.
Figure 3A:
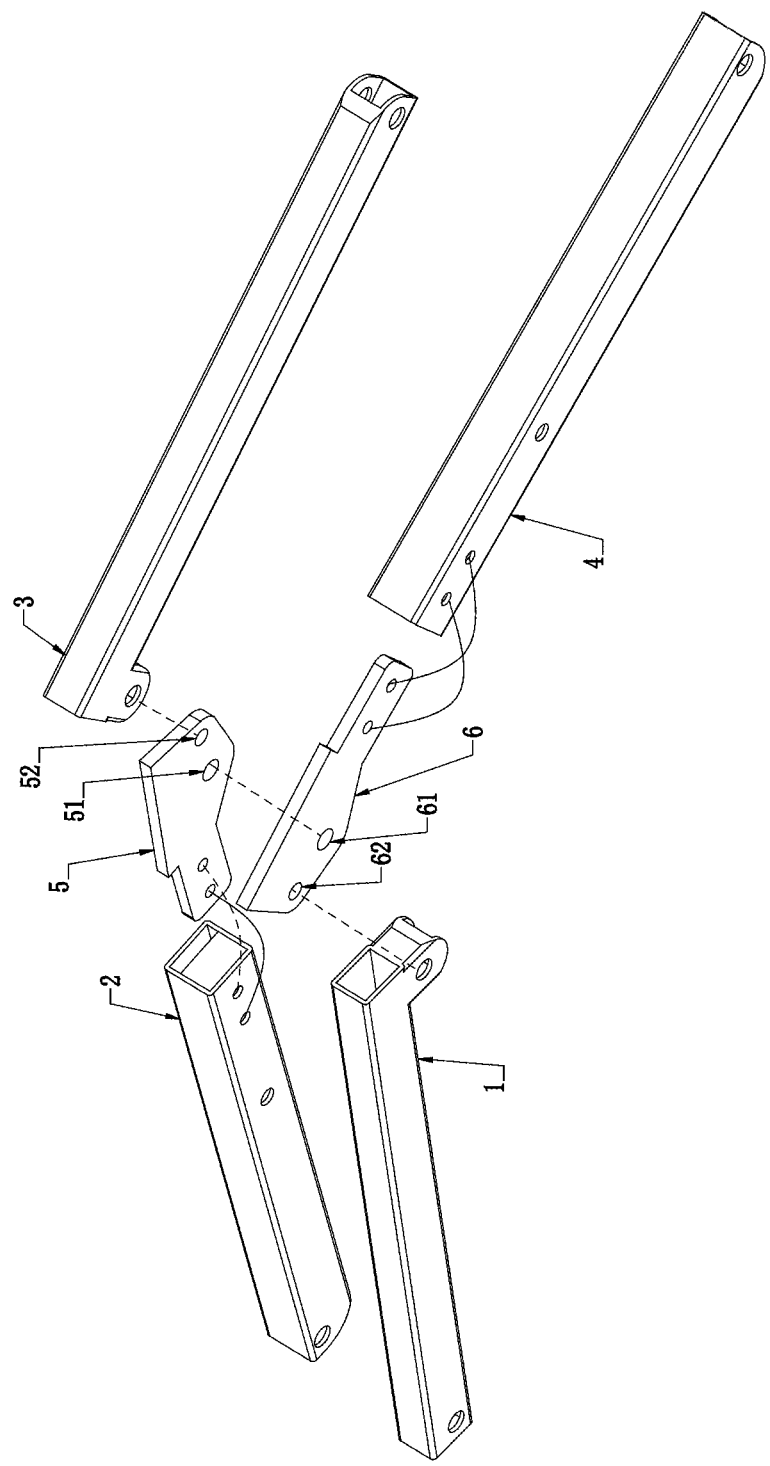
FIG. 3A is an exploded view of part A in FIG. 2.
Figure 3B:
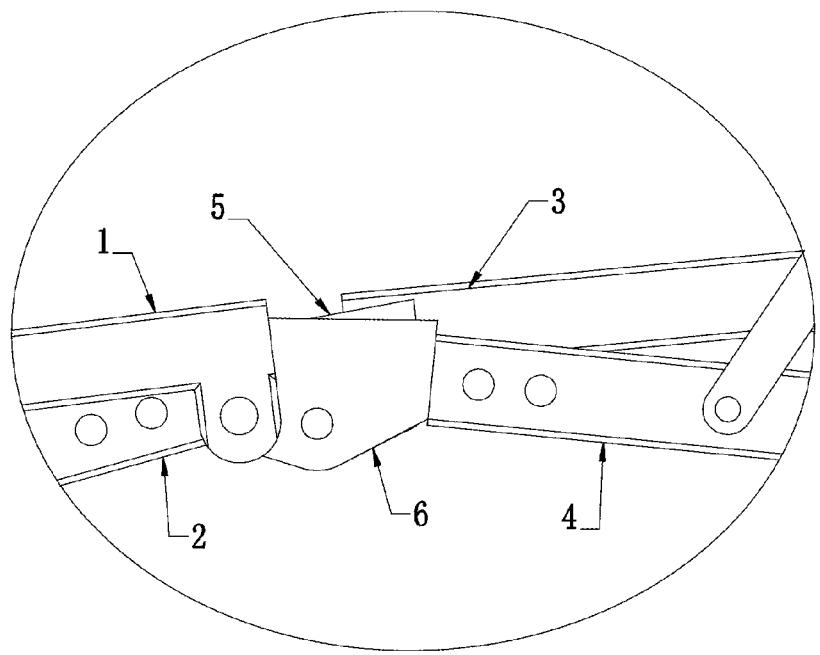
FIG. 3B and FIG. 3C are assembly views of part A in FIG. 2.
Figure 3C:
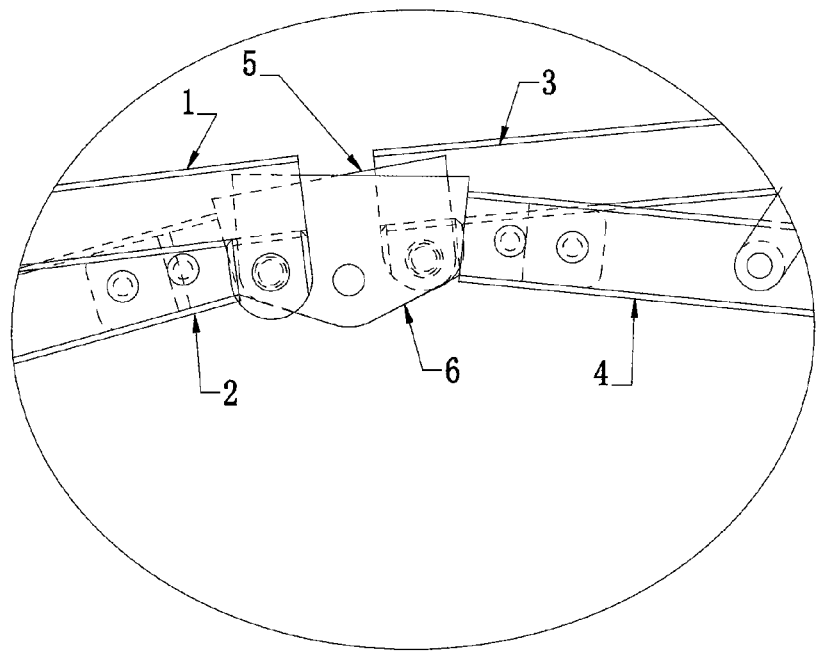
Figure 3D:
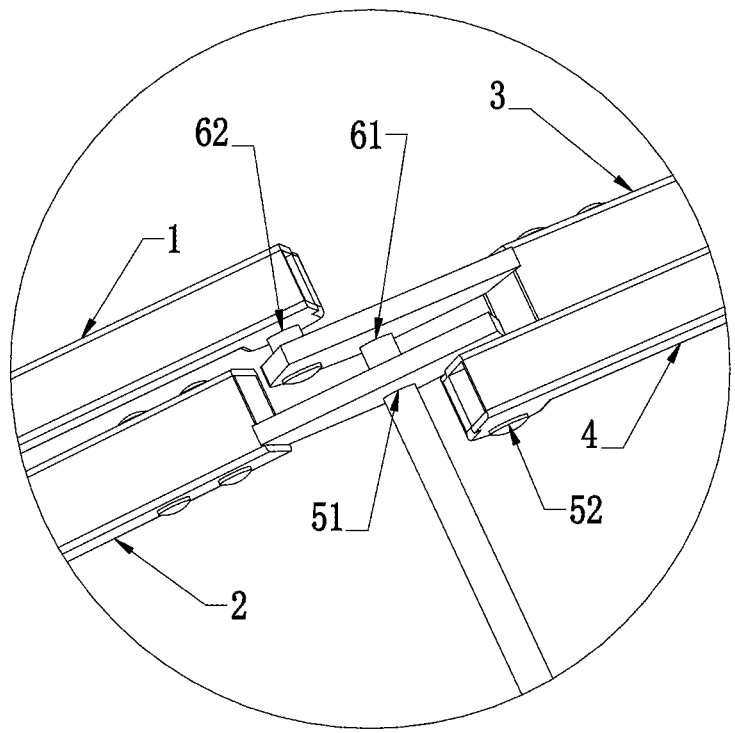
FIG. 3D and FIG. 3E are assembly views of part A in FIG. 2 viewed from another angle.
Figure 3E:
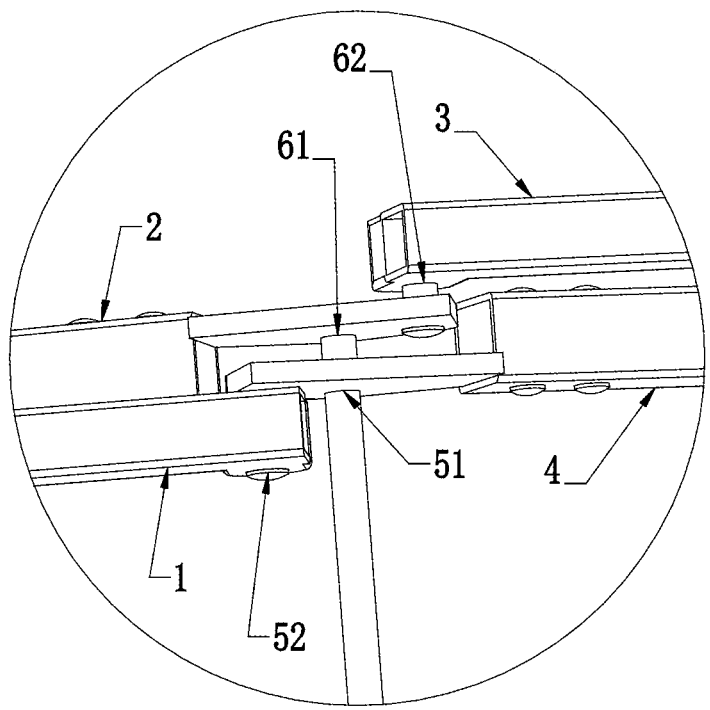

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

The following description is made as to the embodiments of the present invention in conjunction with the accompanying drawings in FIGS. 1-8.

As shown in FIG. 1, foldable frames 100 of the present invention are symmetrically mounted at two sides between a front wheel support 101 and a rear wheel support 102 of a foldable vehicle. The foldable frame 100 includes a first upper bar 1, a first lower bar 2, a second upper bar 3, a second lower bar 4, a first pin joint piece 5, a second pin joint piece 6, a foldable seat 7, and a linkage bar 8.

Referring to FIGS. 2 and 3A-3E, the first pin joint piece 5 and the second pin joint piece 6 are respectively provided with first pin joint holes 51 and 61 and second pin joint holes 52 and 62. An end of the first lower bar 2 is pin-jointed with a lower end of the front wheel support 101, and another end of the first lower bar 2 is fixed with the first pin joint piece 5. An end of the second lower bar 4 is pin-jointed with a lower end of the rear wheel support 102, and another end of the second lower bar 4 is fixed with the second pin joint piece 6. The first pin joint piece 5 is pin-jointed with the second pin joint piece 6 through the first pin joint holes 51 and 61. An end of the first upper bar 1 is pin-jointed with an upper end of the front wheel support 101, and another end of the first upper bar 1 is pin-jointed at the second pin-joint hole 62 of the second pin joint piece 6. An end of the second upper bar 3 is pin-jointed with the rear wheel support 102, and another end of the second upper bar 3 is pin-jointed at the second pin joint hole 52 of the first pin joint piece 5. When the first lower bar 2 and the second lower bar 4 are unfolded, an end surface of the first pin joint piece 5 abuts against an end surface of the second lower bar 4, and at the same time, an end surface of the second pin joint piece 6 abuts against an end surface of the first lower bar 2. The first upper bar 1, the first lower bar 2, the front wheel support 101, and the second pin joint piece 6 form a quadrilateral support; the second upper bar 3, the second lower bar 4, the rear wheel support 102, and the first pin joint piece 5 form another quadrilateral support. The two quadrilateral supports are pin-jointed with each other.

Figure 4:
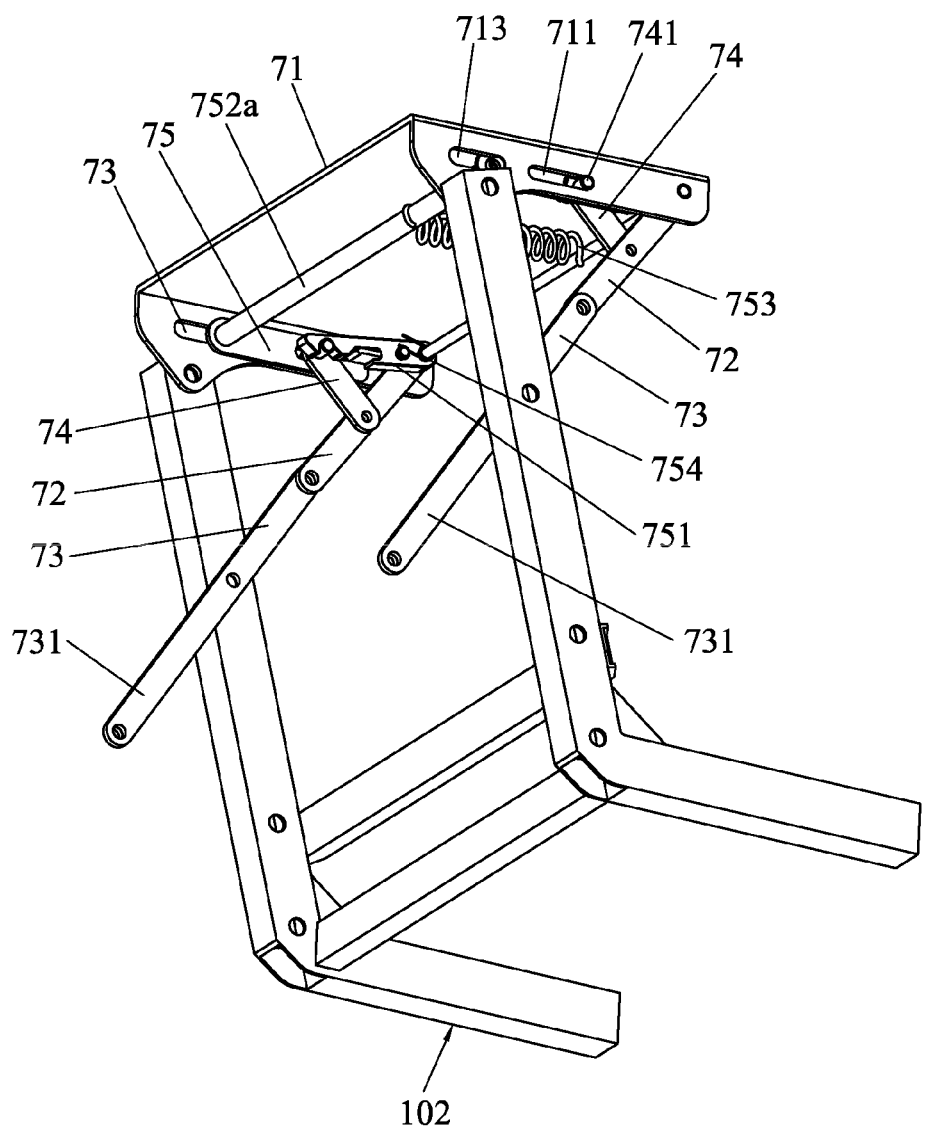
FIG. 4 is a schematic structural view of a foldable seat in a foldable frame according to the present invention.

Further referring to FIG. 4, the foldable seat 7 includes a seat 71, a first support bar 72, a second support bar 73, a third support bar 74, and a locking mechanism 75. A front end of the seat 71 is pin-jointed with an upper end of the rear wheel support 102. A rear end of the seat 71 is pin-jointed with an end of the first support bar 72. Another end of the first support bar 72 is pin-jointed with an end of the second support bar 73. Another end of the second support bar 73 is pin-jointed with the rear wheel support 102. Two ends of the seat 71 are respectively pin-jointed with the rear wheel support 102 and the first support bar 72, and the second support bar 73 is pin jointed with the first support bar 72, so that the rear wheel support 102, the seat 71, the first support bar 72, and the second support bar 73 form a flexible quadrilateral, thereby achieving the objective of folding or unfolding the seat 71. The structure is simple, and the folded seat 71 significantly reduces the storage space. A connection portion 731 is extended from an end, pin-jointed with a middle portion of the rear wheel support 102, of the second support bar 73. A tail end of the connection portion 731 is pin-jointed with the linkage bar 8. Another end of the linkage bar 8 is pin-jointed with the second lower bar 4. In this way, when the seat 71 is folded towards the rear wheel support 102, the linkage bar 8 is driven by the second support bar 73, and the second lower bar 4 is driven at the same time, thereby ultimately achieving the objective of simultaneously folding the first upper bar 1, the first lower bar 2, the second upper bar 3, and the second lower bar 4 while folding the seat 71, so that the entire foldable frame 100 is folded conveniently and quickly. An end of the third support bar 74 is pin-jointed with a middle portion of the first support bar 72. A first long hole 711 is opened on a side wall of the seat 71. A shaft pin 741 is disposed at another end of the third support bar 74. The shaft pin 741 is disposed in the first long hole 711 in a sliding manner. Through disposing the third support bar 74 between the seat 71 and the first support bar 72 and opening, on the side wall of the seat 71, the first long hole 711 for an end portion of the third support bar 74 to slide through, the seat 71, the first support bar 72, and the third support bar 74 form a flexible triangle, thereby controlling the reciprocating swing of the first support bar 72.

Figure 5:
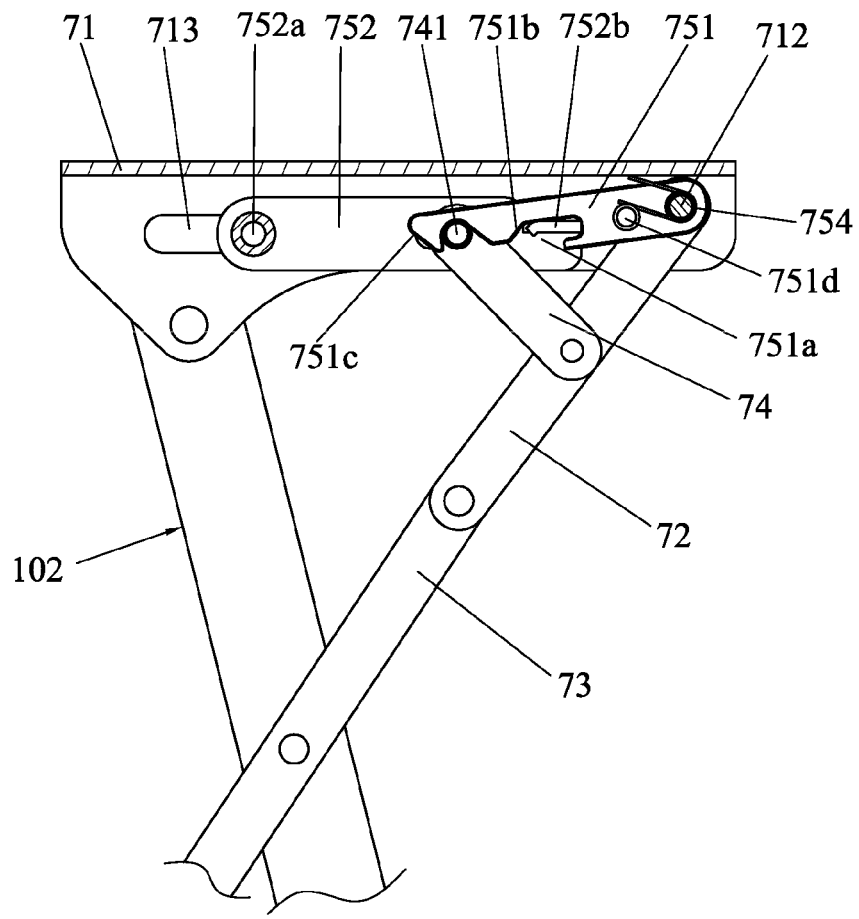
FIG. 5 is a schematic structural view of a locking mechanism in a locked state according to the present invention.
Figure 6:
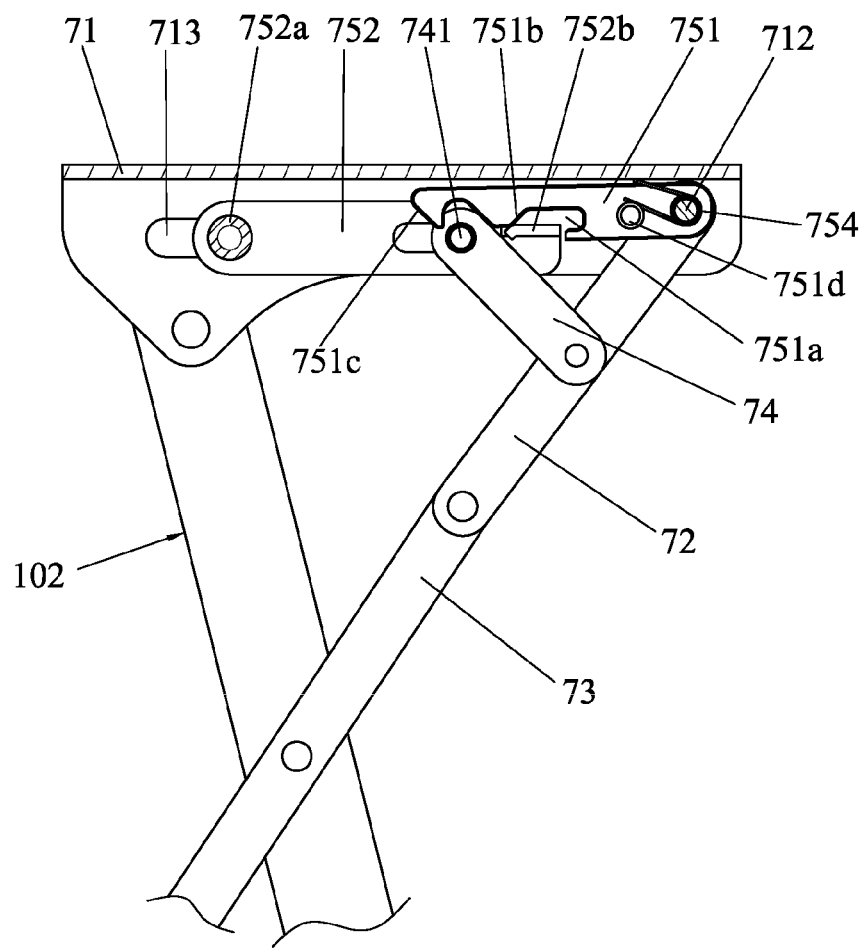
FIG. 6 is a schematic view of a locking mechanism in an unlocked state according to the present invention.

Referring to FIGS. 5 and 6, the locking mechanism 75 includes a fastening hook 751, a pushing piece 752, an elastic piece 753, and a torsion spring 754. A rear end of the fastening hook 751 is pin-jointed with a fixing shaft 712 disposed at a bottom portion of the seat 71, and is capable of being separately fastened with the shaft pin 741. The fastening hook 751 of the locking mechanism 75 is fastened with or released from the shaft pin 741, so that the third support bar 74 is unlocked or locked, controlling the third support bar 74 to swing or to be fixed and further controlling the foldable seat 7 to be folded or unfolded, thereby effectively improving the structural stability of the foldable seat 7 and ensuring use safety. Specifically, a propping post 751d is extended outward from a side surface at the rear end of the fastening hook 751. An end of the torsion spring 754 abuts against the propping post 751d, and another end of the torsion spring 754 abuts against a bottom surface of the seat 71. The foldable seat 7 needs is locked when it is in the unfolded position, and at this time, fastening between the fastening hook 751 and the shaft pin 741 needs to be maintained. Therefore, by means of the automatic resilience of the torsion spring 754, the fastening hook 751 automatically rotates downward, thereby ensuring the fastening with the shaft pin 741, and preventing the danger of unexpected folding during driving due to accidental release of the fastening hook 751 from the shaft pin 741 when the seat 71 is in the unfolded position.

Referring again to FIGS. 5 and 6, the pushing piece 752 is mounted on the side wall of the seat 71 in a sliding manner. A second long hole 713 is opened on the side wall of the seat 71. A sliding shaft 752a is disposed on the pushing piece 752. The sliding shaft 752a passes through the second long hole 713 in a sliding manner. Through the sliding coordination between the second long hole 713 and the sliding shaft 752a, the pushing piece 752 is disposed on the side wall of the seat 71 in a sliding manner, thereby conveniently driving the fastening hook 751 to be unlocked. Specifically, an end of the pushing piece 752 is provided with a pushing block 752b. A receiving hole 751a with an opening is provided on the fastening hook 751. The pushing block 752b is received in the receiving hole 751a in a sliding manner. The opening is used for the pushing block 752b to enter and exit. A front end of the receiving hole 751a has a first slope 751b tilted from an upper end of the pushing block 752b towards the front end. The pushing block 752b abuts against the first slope 751b in a sliding manner. The fastening hook 751 is fastened with the shaft pin 741, and the fastening hook 751 needs to be manually released from the shaft pin 741 during unlocking. Therefore, the pushing piece 752 is disposed and the pushing block 752b is provided on the pushing piece. The pushing block 752b slides in the receiving hole 751a of the fastening hook 751 and abuts against the first slope 751b. Hence, under the guiding function of the first slope 751b, the fastening hook 751 is pushed to be released from the shaft pin 741, thereby achieving the objective of unlocking. The pushing piece 752 functions to drive the unlocking, contributing to convenient use for users. An end of the elastic piece 753 is connected to the fixing shaft 712, and another end of the elastic piece 753 is connected to the sliding shaft 752a. The elastic piece 753 is an extension spring. By means of the elastic resilience of the extension spring 753, the pushing piece 752 moves backward automatically, so that the pushing block 752b automatically returns to the receiving hole 751a, thereby effectively implementing next unlocking.

A front end of the fastening hook 751 has a second slope 751c tilted from an upper end to a rear end. When the shaft pin 741 slides backward along the first long hole 711, the second slope 751c abuts against the shaft pin 741 in a sliding manner. When the shaft pin 741 and the fastening hook 751 need to be fastened again, the fastening hook 751 needs to be pushed upward. Therefore, the second slope 751c is disposed. By means of the guiding function of the second slope 751c, when the shaft pin 741 slides backward, the fastening hook 751 is pushed to rotate upward, so that the fastening hook 751 is automatically fastened on the shaft pin 741 after dodging the shaft pin 741.

Figure 7:
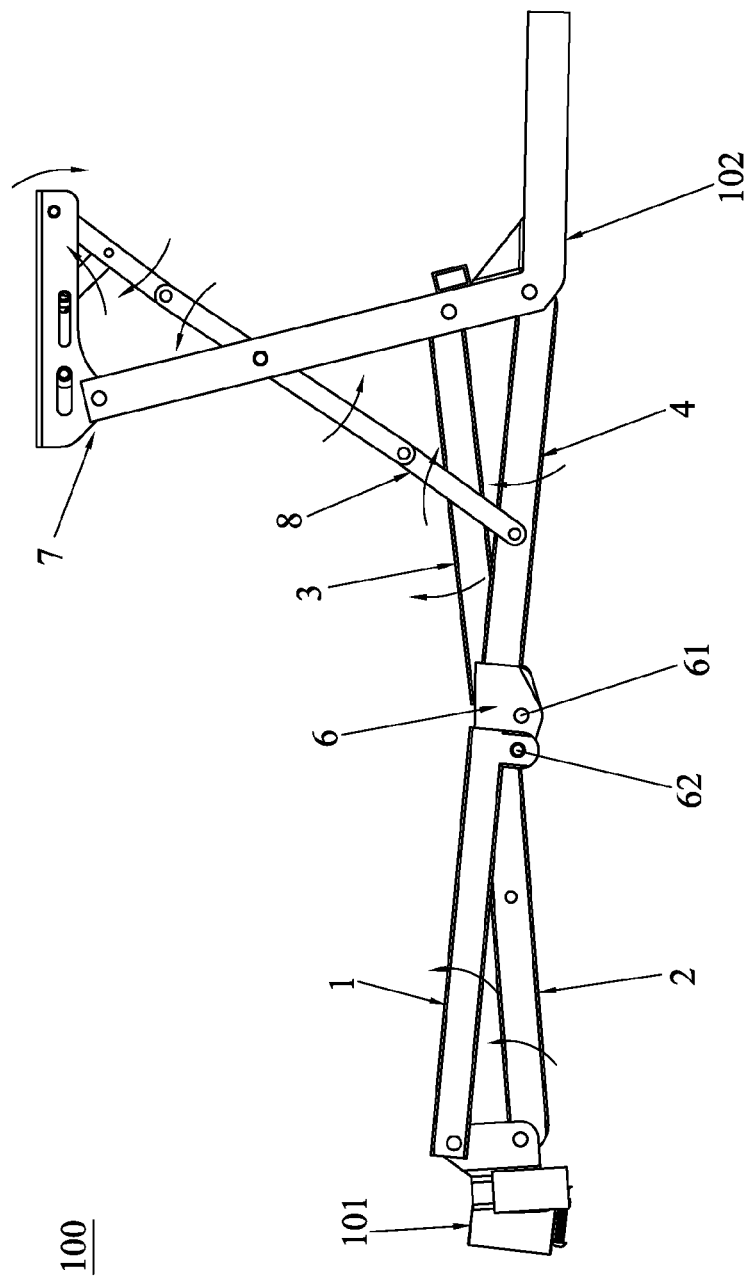
FIG. 7 is a view showing rotating states of components of a foldable frame when the foldable frame is folded according the present invention.
Figure 8:
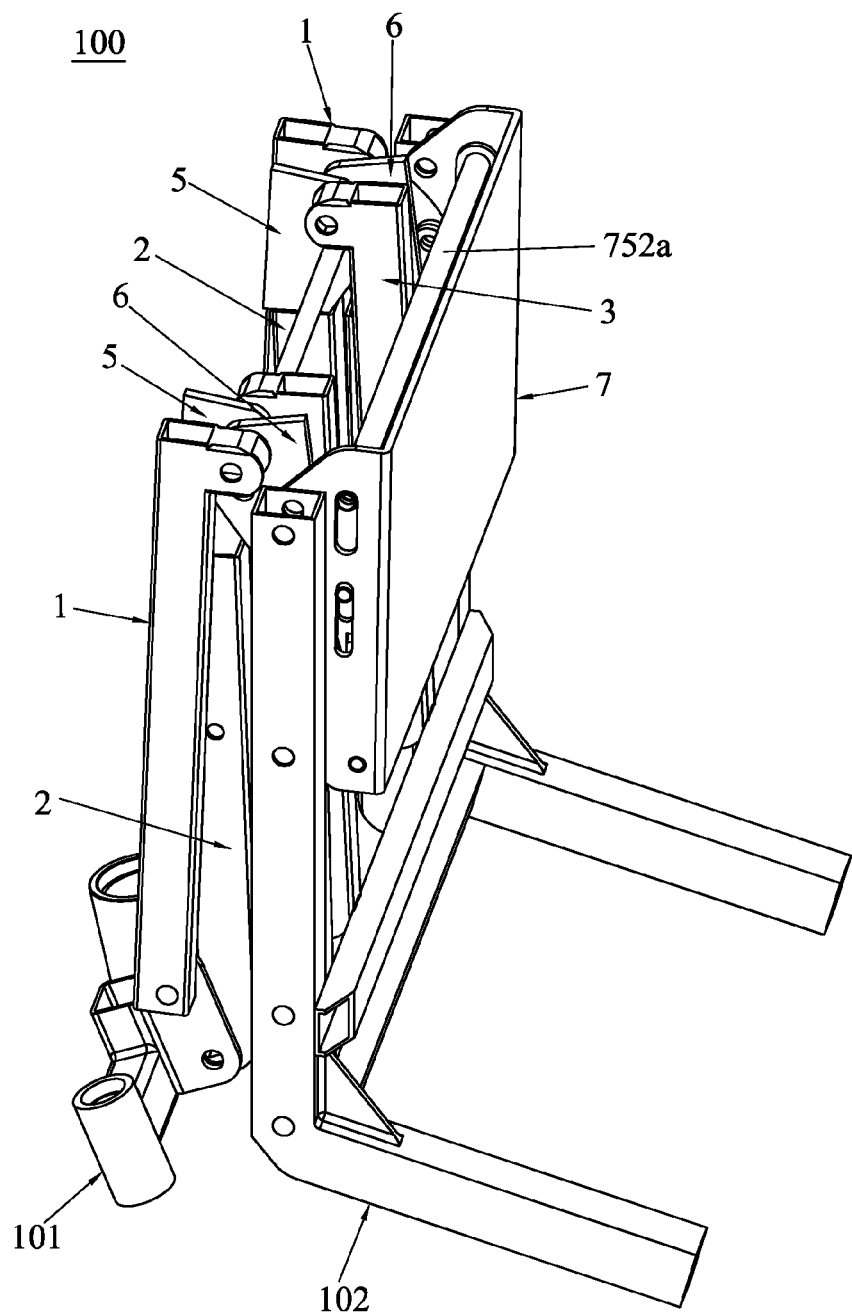
FIG. 8 is a schematic view showing a state after foldable frame is completely folded according to the present invention.

With reference to FIGS. 6-8 comprehensively, the folding principle of the foldable frame 100 of the present invention is described in detail as follows:

When the foldable frame 100 is completely unfolded, the first pin joint holes 51 and 61 and the second pin joint holes 52 and 62 on the first pin joint piece 5 and the second pin joint piece 6 are substantially in a horizontal state. The first upper bar 1 and the first lower bar 2 approximately intersect with the second upper bar 3 and the second lower bar 4. The seat 71 is in a horizontal state. At this time, the fastening hook 751 is fastened with the shaft pin 741; the shaft pin 741 is located at the rear end of the first long hole 711; the first support bar 72, the second support bar 73 and the linkage bar 8 are connected in a straight line; and the sliding shaft 752a is located at the rear end of the second long hole 713. When the foldable frame 100 needs to be folded, the sliding shaft 752a is pulled, so that the sliding shaft 752a moves from the rear end to the front end of the second long hole 713; meanwhile, the extension spring 753 is stretched, and drives the pushing block 752b to move forward through the pushing piece 752. The pushing block 752b abuts against the first slope 751b, thereby driving the fastening hook 751 to rotate upward, so as to release the fastening hook 751 from the shaft pin 741. At this time, the shaft pin 741 is in an unlocked state. When the pushing block 752b continues to move forward and leaves the receiving hole 751a, the pushing block 752b pushes the shaft pin 741 to move forward. The third support bar 74 rotates, thereby driving the first support bar 72 to rotate. Hence, the seat 71 rotates downward and is folded. During the folding process, two ends of the second support bar 73 rotate towards the rear wheel support 102. Therefore, the lower end of the second support bar 73 drives the linkage bar 8 to rotate, and the rotating linkage bar 8 drives the second lower bar 4 to rotate upward. Two quadrilateral supports formed of the first upper bar 1, the second upper bar 2, the first lower bar 3 and the second lower bar 4 are in linkage with each other, so the two quadrilateral supports move close to each other when rotating downward, until the first lower bar 2 is parallel to the second lower bar 4. At this time, the foldable frame 100 can be folded completely. When the foldable frame 100 needs to be unfolded again, it is only required to unfold the two quadrilateral supports formed of the first upper bar 1, the second upper bar 3, the first lower bar 2 and the second lower bar 4. At this time, under the linkage effect of the linkage bar 8, the foldable seat 7 is unfolded at the same time, and the shaft pin 741 moves from the front end of the first long hole 711. Under the effect of the elastic resilience of the extension spring 753 and the torsion spring 754, the fastening hook is restored to a downward state at this time, so the shaft pin 741 abuts against the second slope 751c while moving, so that the fastening hook 751 rotates upward. When the fastening hook 751 reaches the fastening position, the fastening hook 751 automatically rotates downward to be hooked with the shaft pin 741, thereby locking the entire foldable frame 100, so that the foldable frame is in a stable unfolded state.

In the present invention, the first pin joint piece 5 is fixed at an end of the first lower bar 2, the second pin joint piece 6 is fixed at an end of the second lower bar 4, and the first and second pin joint pieces 5 and 6 are pin-jointed with each other. Besides, two ends of the first upper bar 1 are pin-jointed with the front wheel support 101 and the second pin joint piece 6, and two ends of the second upper bar 3 are pin-jointed with the rear wheel support 102 and the first pin joint piece 5, thereby forming the foldable frame structured by two pin-jointed quadrilateral supports. By means of the properties of variation and linkage of the two quadrilateral supports, the objective of folding or unfolding the foldable frame 100 is achieved. Moreover, when the first lower bar 2 and the second lower bar 4 are unfolded, the end portion of the first pin joint piece 5 abuts against the end portion of the second lower bar 4, and meanwhile the end portion of the second pin joint piece 6 abuts against the end portion of the first lower bar 2. Under the effect of interaction, the foldable frame 100 formed of two quadrilateral supports is in a stable state, achieving the bearing objective. In this way, the entire foldable frame 100 has a stable structure. The foldable frame 100 is folded as long as any one of the bars is rotated around the pin joint point thereof. The foldable frame 100 is convenient to use, has a small size after being folded, significantly saves the storage space, and has desirable portability in during traveling.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A foldable frame, mounted between a front wheel support and a rear wheel support of a foldable vehicle, comprising:
   (a) a first upper bar;
   (b) a first lower bar;
   (c) a second upper bar;
   (d) a second lower bar;
   (e) a first pin joint piece; and
   (f) a second pin joint piece,
   wherein the first pin joint piece and the second pin joint piece are respectively provided with a first pin joint hole and a second pin joint hole; an end of the first lower bar is pin-jointed with a lower end of the front wheel support, and another end of the first lower bar is fixed with the first pin joint piece; an end of the second lower bar is pin-jointed with a lower end of the rear wheel support, and another end of the second lower bar is fixed with the second pin joint piece; the first pin joint piece is pin-jointed with the second pin joint piece through the first pin joint hole, and end surfaces of the first pin joint piece and the second pin joint piece respectively abut against end portions of the second lower bar and the first lower bar; an end of the first upper bar is pin-jointed with the front wheel support, and another end of the first upper bar is pin-jointed at the second pin joint hole of the second pin joint piece; an end of the second upper bar is pin-jointed with the rear wheel support, and another end of the second upper bar is pin-jointed at the second pin-joint hole of the first pin joint piece.

2. The foldable frame according to claim 1, further comprising a foldable seat, wherein the foldable seat comprises a seat, a first support bar and a second support bar, a front end of the seat is pin-jointed with an upper end of the rear wheel support, a rear end of the seat is pin-jointed with an end of the first support bar, another end of the first support bar is pin-jointed with an end of the second support bar, and another end of the second support bar is pin-jointed with the rear wheel support.

3. The foldable frame according to claim 2, further comprising a linkage bar, wherein a connection portion is extended from an end of the second support bar and is pin-jointed with a middle portion of the rear wheel support, a tail end of the connection portion is pin-jointed with an end of the linkage bar, and another end of the linkage bar is pin-jointed with the second lower bar.

4. The foldable frame according to claim 2, further comprising a third support bar and a locking mechanism, wherein an end of the third support bar is pin-jointed with the first support bar, a first long hole is opened on a side wall of the seat, a shaft pin is disposed at another end of the third support bar, the shaft pin is disposed in the first long hole in a sliding manner, the locking mechanism comprises a fastening hook, a rear end of the fastening hook is pin-jointed with a fixing shaft disposed at a bottom portion of the seat, and is capable of being separately fastened with the shaft pin.

5. The foldable frame according to claim 4, wherein the locking mechanism further comprises a pushing piece, the pushing piece is mounted on the side wall of the seat in a sliding manner, and a pushing block is provided at an end of the pushing piece, a receiving hole with an opening is opened on the fastening hook, the pushing block is received in the receiving hole, the opening is used for the pushing block to enter and exit, a front end of the receiving hole has a first slope tilted from an upper end to the front end, and the pushing block abuts against the first slope in a sliding manner.

6. The foldable frame according to claim 4, wherein a front end of the fastening hook has a second slope tilted from an upper end to a rear end, and when the shaft pin slides backward along the long hole, the second slope abuts against the shaft pin in a sliding manner.

7. The foldable frame according to claim 4, wherein the locking mechanism further comprises a torsion spring, an end of the torsion spring abuts against the rear end of the fastening hook, and another end of the torsion spring abuts against the seat.

8. The foldable frame according to claim 5, wherein a second long hole is opened on the side wall of the seat, a sliding shaft is disposed on the pushing piece, and the sliding shaft passes through the second long hole in a sliding manner.

9. The foldable frame according to claim 8, wherein the locking mechanism further comprises an elastic piece, an end of the elastic piece is connected with the fixing shaft, and another end of the elastic piece is connected with the sliding shaft.

10. The foldable frame according to claim 9, wherein the elastic piece an extension spring.

11. A foldable vehicle, comprising a foldable frame according to claim 1.

* * * * *